Patented Sept. 18, 1945

2,385,018

UNITED STATES PATENT OFFICE 2,385,018

STABILIZATION OF ESTERS

Charles R. Milone, Akron, Ohio, assignor to Wingfoot Corporation, Akron, Ohio, a corporation of Delaware No Drawing. Application August 25, 1942,
Serial No. 456,089

6 Claims. (Cl. 260—485)

This invention relates to the stabilization of esters of monohalo maleic or fumaric acid, such as the chloro- and bromomaleates and -fumarates. The invention includes the stabilized compositions and the method of effecting the stabilization.

On standing the chloro- and bromomaleates and -fumarates liberate hydrogen halide. Esters of acetylene dicarboxylic acid are produced. Often these esters have a boiling point so near that of the halo maleates and fumarates that separation of the two is difficult, even by the usual fractionating means. At any rate, distillation is required to purify the chloromaleates and -fumarates if they are allowed to stand any appreciable time in the absence of a stabilizer.

The liberation of hydrogen chloride seems to be entirely independent of the nature of the esterifying group. The esters may be stabilized by activated carbon. The presence of activated carbon retards or prevents liberation of HCl regardless of whether the ester is a dialkyl ester, such as a dimethyl, diethyl, or diamyl ester; or a heterocyclic ester, such as a furfuryl or tetrahydrofurfuryl ester; or a cycloalkyl ester, such as a cyclohexyl or menthyl ester, etc.; or an unsaturated aliphatic ester, such as a vinyl or allyl ester, or the ester of a polyhydric alcohol.

The ester may be stabilized by admixture with a small amount of activated carbon. For example, the addition of 2 per cent of activated carbon to the dicyclohexyl monochloromaleate will prevent or retard the liberation of hydrogen chloride on standing, as in storage. The activated carbon stabilizer is thoroughly admixed with the ester. If the unstabilized ester is stored in a stoppered bottle for a few days, hydrogen chloride can be detected over the ester. As compared to this, no trace of hydrogen chloride is detectable over the stabilized esters after storage for several weeks or longer.

What I claim is:

1. A method of preventing the decomposition of esters of the class consisting of monochlorofumarates, monobromofumarates, monochloromaleates and monobromomaleates which method comprises adding activated carbon thereto.

2. A method of preventing the decomposition of an ester of chloromaleic acid which comprises adding activated carbon thereto.

3. An ester of the class consisting of monochlorofumarates, monobromofumarates, monochloromaleates and monobromomaleates which is stabilized by the presence of activated carbon.

4. A stabilized mixture of activated carbon and an ester of the class consisting of monochlorofumarates, monobromofumarates, monochloromaleates and monobromomaleates.

5. A stabilized mixture of activated carbon and an ester of chloromaleic acid.

6. An ester of monochloromaleic acid which is stabilized by the presence therein of activated carbon.

CHARLES R. MILONE.